UNITED STATES PATENT OFFICE.

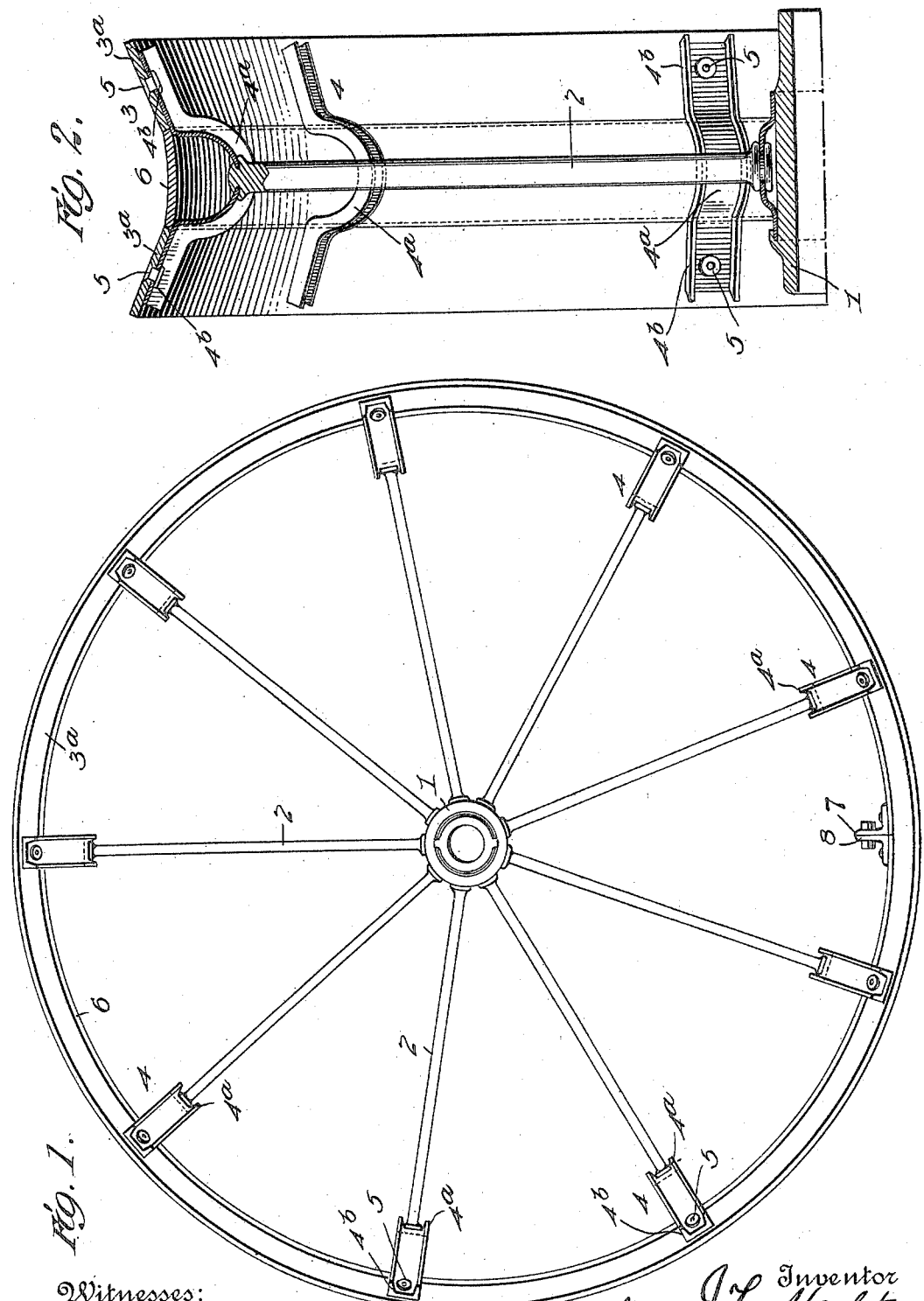

JOSEPH L. HECHT, OF DAVENPORT, IOWA, ASSIGNOR, BY MESNE ASSIGNMENTS, TO G. WATSON FRENCH, NATHANIEL FRENCH, AND JOSEPH L. HECHT, OF DAVENPORT, IOWA, A FIRM.

SUPPLEMENTAL RIM FOR WHEELS.

948,138.  Specification of Letters Patent.  Patented Feb. 1, 1910.

Application filed August 28, 1908. Serial No. 450,604.

*To all whom it may concern:*

Be it known that I, JOSEPH L. HECHT, of Davenport, county of Scott, and State of Iowa, have invented a new and useful Improvement in Supplemental Rims for Wheels, of which the following is a specification.

This invention relates to wheels for agricultural implements, the object of the invention being to provide means whereby the character of the tread surface may be changed to meet the changing conditions encountered in the field, as regards the character of the soil, the nature of the work to be done, etc.

The invention has special reference to wheels used on seed planters in general, and corn-planters in particular, in connection with which machines two types of wheels are usually employed, one type having what is known as a "split" or "open" rim comprising two rim-sections or bands spaced apart so as to present a space between them extending circumferentially around the wheel; and the other type known as the "concave" or "solid" rim wheel, in which the rim presents a continuous unbroken surface. Under certain conditions there is a demand for the use of one type, while under other conditions the other type is required, and it is the aim of my invention to adapt a wheel of the "split-rim" type to be readily converted into a wheel with a continuous unbroken rim.

The invention consists therefore primarily of a supplemental tire or rim adapted to be applied to a wheel with a "split" rim, and being of a form and construction to bridge the circumferential space between the rim-sections; whereby a continuous tread surface will be formed.

The invention consists also in combination with a wheel having a two-part rim, the parts of which are connected with the spokes by intermediate connecting devices, a supplemental tire or rim adapted to bridge the circumferential space between the separated rim-sections, and receive support from the said intermediate connecting devices.

The invention consists also in the details of construction and combination of parts hereinafter described and claimed.

In the accompanying drawings:—Figure 1 is a side elevation of a wheel having my improved supplemental rim applied thereto. Fig. 2 is a longitudinal sectional elevation through the side of the wheel.

Referring to the drawings:—1 represents the hub; 2 the spokes, and 3 the rim or tire, the latter consisting of two bands or rim-sections 3ª extending circumferentially around the hub parallel with each other, with a circumferential space between them, which sections are connected to the spokes and maintained in fixed relations and properly spaced apart by means of intermediate connecting devices 4, connected respectively with the outer ends of the spokes and the rim-sections, this construction producing what is commonly known in the trade as a "split-rim" wheel. In the present instance, the connecting devices 4, between the ends of the spokes and the rim-sections, are in the form of yokes having a central curved body portion 4ª extending inwardly toward the center of the wheel and connected with the ends of the spokes, from the ends of which body portions arms 4ᵇ extend outwardly and are seated against the inner sides of the rim-sections, to which the arms are firmly connected as by the rivets 5 and serve to firmly support the rim-sections and maintain them fixedly in spaced relations.

6 represents my improved supplemental rim which, as shown, consists of a flat plate or strip bent into circular form and fitting between the inner edges of the two rim-sections, thus bridging the circumferential space between them, and forming a continuation of their outer surfaces; whereby a continuous unbroken tread is produced. In the construction shown, the outer edges of the supplemental rim receives firm support from the arms 4ª of the yokes, which arms are extended inwardly a short distance beyond the inner edges of the rim-sections, thereby forming supporting shoulders on the yokes situated at the junction of the arms with the central body portions. In the present instance, the two outer rim-sections extend at a slight inclination inward from their outer edges, producing a tread surface concaved or dished in cross section, and the central supplemental rim 6 is slightly concaved to form a continuation of this surface, so that when applied to the wheel as described, the tread or surface of the same will be continuous and concaved in cross section. It is seen therefore that by the employment of the supplemental rim described, a wheel with a two-part or "split" rim may be readily converted into a wheel with a continuous rim and in this manner be utilized under conditions, in view of which it would be otherwise necessary to provide a separate set of wheels.

The supplemental rim is preferably made in a single piece with open ends, and is applied to the wheel by separating the ends and springing it over the wheel rim, after which it may be fastened in position on the supporting shoulders of the yoke-arms, by means of a fastening bolt 7 extending through inwardly projecting ears 8 on the ends of the supplemental rim, by which said ends may be drawn tightly together.

It will be manifest that the supplemental rim may be made in sections or segments secured together end to end by the means just described, or by other suitable means.

It will be observed that by setting the supplemental rim 6 in between the two permanent rim sections 3 and 3ª, so that the edges of the supplemental rim will abut against the edges of said permanent rim sections, the supplemental rim will be effectually held against lateral shifting and will at the same time form a smooth and unobstructed continuation of the rim sections.

Having thus described my invention, what I claim is:—

1. In a wheel, the combination with the separated rim sections, of a supplemental rim bridging the space between the rim sections and fitting in between said sections, the outer edges of said supplemental rim abutting against the inner edges of the rim sections; whereby the supplemental rim will be firmly held against sidewise displacement.

2. In a wheel, the combination with the separated rim sections, of a supplemental rim bridging the space between the rim sections, and means independent of said rim sections for giving radial support to the supplemental rim.

3. In a wheel, the combination with the hub and spokes, of a rim comprising two separated rim-sections, yokes provided with a central body portion fastened to the ends of the spokes, and outwardly extending arms fastened to said rim-sections, and a supplemental rim bridging the space between the rim-sections and supported at its edges directly by the yoke-arms.

4. In a wheel, the combination with the hub, spokes and rim, the latter comprising two separated rim sections, of connecting devices between the rim sections and the ends of the spokes, said connecting devices being extended inward at the inner edges of the rim sections to afford supports for a supplemental rim, and a supplemental rim bridging the space between the rim sections and supported at its edges on the supporting surfaces of the connecting devices.

In testimony whereof I hereunto set my hand this 17th day of August, 1908, in the presence of two attesting witnesses.

JOSEPH L. HECHT.

Witnesses:
ANDREW NEILSON,
LEON ZOECKLER.